United States Patent [19]

Timbers et al.

[11] 4,387,630

[45] Jun. 14, 1983

[54] FOOD PROCESSING WITH STEAM

[75] Inventors: Gordon E. Timbers, Nepean; Robert Stark, Centreville; Jacques C. Caron, Orleans; Daniel B. Cumming, Summerland; Richard R. Cowmeadow, Halifax; Alexander W. Gingell, Bridgewater, all of Canada

[73] Assignee: Canadian Patents & Development Limited, Ottawa, Canada

[21] Appl. No.: 386,309

[22] Filed: Jun. 8, 1982

[30] Foreign Application Priority Data

Aug. 20, 1981 [CA] Canada ................................. 384276

[51] Int. Cl.³ ............................................. A23L 3/04
[52] U.S. Cl. ..................................... 99/348; 99/355; 99/516
[58] Field of Search ............... 99/398, 516, 483, 355, 99/443 C, 485, 484; 426/510, 511, 508, 467

[56] References Cited

U.S. PATENT DOCUMENTS

| 2,534,648 | 12/1950 | Wilbur | 99/443 C |
|---|---|---|---|
| 2,788,735 | 4/1957 | Farace | 99/355 |
| 2,917,827 | 12/1959 | Lankford | 99/348 |
| 3,537,862 | 11/1970 | Peters | 426/510 |
| 3,573,938 | 4/1971 | Kelly | 99/483 |
| 3,718,082 | 2/1973 | Lipoma | 99/483 |
| 4,284,359 | 8/1981 | Rapolla | 99/516 |

Primary Examiner—Robert W. Jenkins
Attorney, Agent, or Firm—Ronald G. Bitner

[57] ABSTRACT

The continuous processing of food products with steam, such as for blanching or cooking of vegetal products. The apparatus comprises a heating module and holding module. The heating module includes a pervious conveyor through which steam is emitted to heat and agitate the products thereon allowing uniform treatment of relatively thick layers of product. The holding module, comprising a compartmentalized conveyor, holds the heated products at an elevated temperature to complete processing without additional heat input.

10 Claims, 4 Drawing Figures

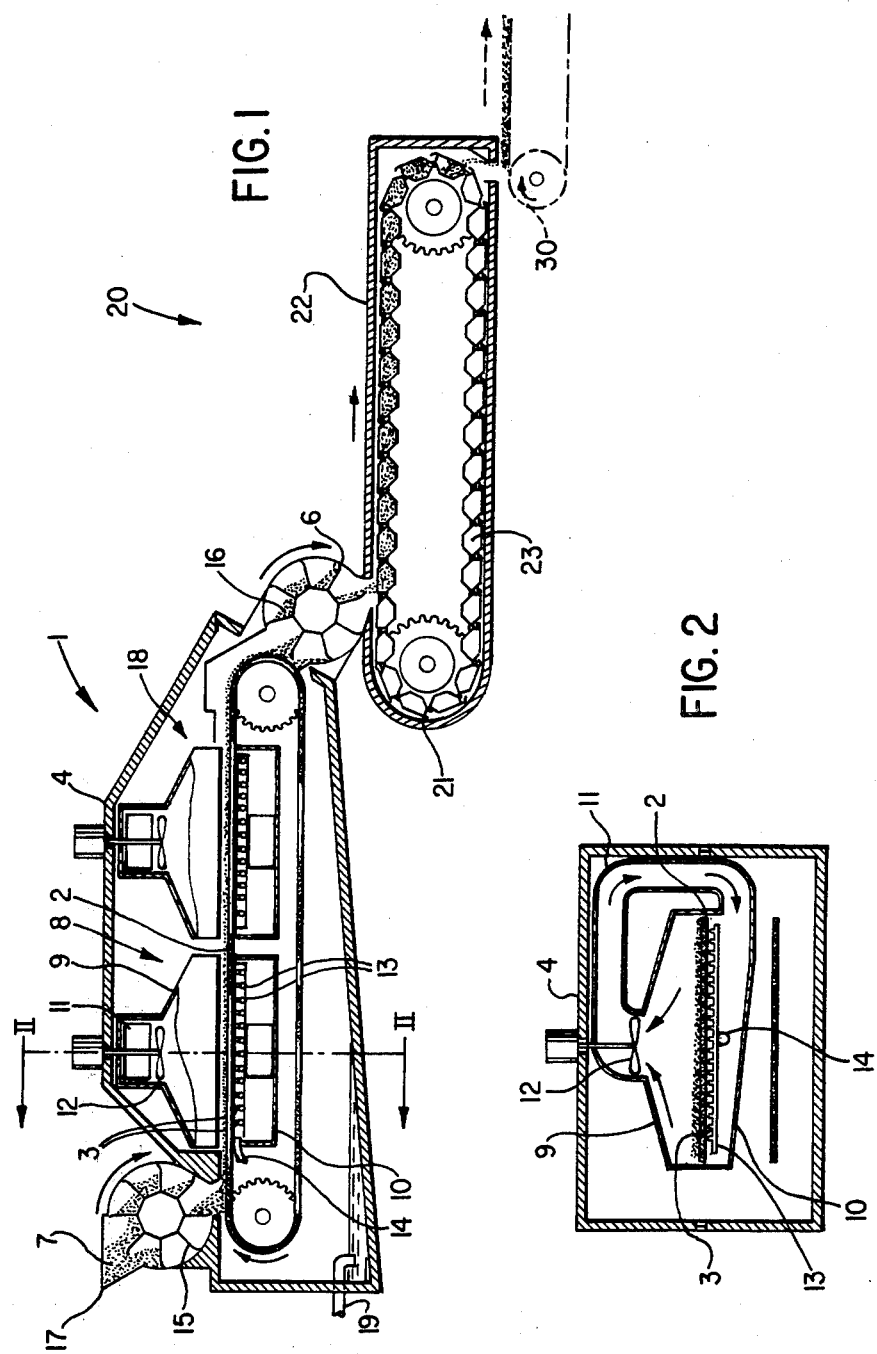

FOOD PROCESSING WITH STEAM

BACKGROUND OF THE INVENTION

This invention relates to processing food products with steam and particularly to an apparatus for continuous blanching or cooking of vegetal products.

Steam blanching is known wherein vegetal products are carried on a perforated belt through a steam blanching chamber having water seals at each end. The known blanchers are inefficient in their use of energy, and the contact of the vegetal product with liquid water at an elevated temperature results in a loss of nutrients, flavour and textural properties, and is a source of high BOD effluent.

It is known to blanch food products with steam using a pervious conveyor. However, to date, in order to provide uniform heating, the product to be treated has been distributed in a single layer on the conveyor. This requirement limits the production rate and is inefficient in its use of energy.

SUMMARY OF THE INVENTION

An object of the invention is to provide an apparatus for blanching or cooking that allows efficient use of energy.

Another object is to provide an apparatus that minimizes nutrient loss and effluent volume.

It has been found that a relatively deep layer of food products, as distinct from a mono-layer, can be uniformly and efficiently heated with steam by using a plurality of closely spaced nozzles below the conveyor for emitting jets of steam into the product which agitate and mix the products while heating.

The present invention provides an apparatus for processing food products with steam which includes a heating module and a holding module. The heating module comprises a pervious conveyor, a plurality of upwardly directed steam emitting nozzles positioned below the conveyor for heating and agitating food products on the conveyor, an outer enclosure enclosing the conveyor and nozzles, a feed valve defining the inlet to the enclosure and for depositing food products in a multilayer on the conveyor, and a transfer valve for transferring heating food products from the heating module to the holding module. The holding module comprises a plurality of holding receptacles adapted to receive heated food products from the heating module and hold the heated products for a period of time at an elevated temperature.

BRIEF DESCRIPTION OF THE DRAWINGS

FIG. 1 is a schematic elevation view of the present invention.

FIG. 2 is a sectional view of the apparatus of FIG. 1 taken at 2—2.

DESCRIPTION OF THE PREFERRED EMBODIMENTS

Figure 3:
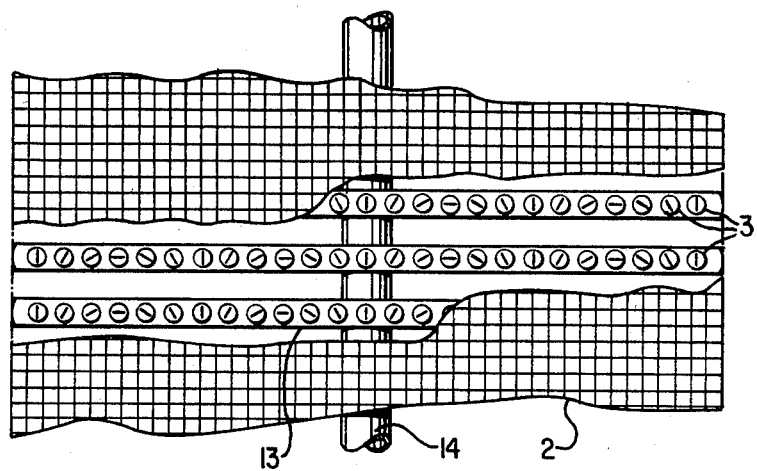
FIG. 3 is a fragmented top view of the pervious conveyor revealing the arrangement of steam emitting nozzles and supply manifolds.

With reference to FIG. 1, the present invention comprises a heating module 1 and a holding module 20.

The heating module 1 includes a pervious conveyor 2, a plurality of closely spaced steam emitting nozzles 3 positioned below the conveyor 2, an outer removable enclosure 4, a rotatable feed valve 5, and a rotatable transfer valve 6.

The holding module 20 comprises a holding conveyor 21 provided with a suitable heat insulating enclosure 22. The holding conveyor 21 comprises a plurality of receptacles 23 adapted to receive the heated food products from the heating module 1 through the rotary transfer valve 6.

With reference to both FIGS. 1 and 2, the heating module further comprises an inner enclosure 8 comprising a hood 9 positioned above the conveyor 2, and a lower removable portion 10 enclosing a region below the conveyor 2 including the nozzles 3. A conduit 11 interconnects the hood 9 and lower portion 10. Within the conduit is a circulating device, such as a fan 12.

The inner enclosure 8 may take the form of separate units arranged serially along the conveyor. FIG. 1 shows two such units 8 and 18. It will be understood that the inner enclosure may be in the form of a single integrated unit, or more than two units.

As shown in FIGS. 1, 2 and 3, the steam emitting nozzles 3 are connected with a plurality of spaced transverse manifolds 13 under the upper loop of the pervious conveyor 2. Each of the manifolds 13 is connected to a longitudinal manifold 14 connected to a suitable source of pressurized steam (not shown). The food products are heated and agitated as the emitted steam contacts and condenses on the surface thereof.

The inlet feed valve 5, as shown in FIG. 1, is in the form of a rotary valve having multiple sealing vanes 15 and a feed hopper portion 17. The vanes 15 may include flexible outer and side portions to facilitate sealing and to provide greater safety in the event of inadvertent introduction of a hand at the hopper 17, as well as preventing damage to vegetal products. The feed valve may be insulated by a damping system from the remainder of the structure, so that a vibrator (not shown) may be connected to the feed valve 5 and/or the transfer valve 6 to facilitate egress of food products that do not flow readily.

To provide control of the heating medium, a temperature sensing device, or devices, positioned, for example, above the food products, in conjunction with a thermostatic controller may be used to modulate steam flow to the nozzles to provide consistent heating. It will be understood that the amount of steam supplied for a given apparatus will depend on the nature of the product and the type of processing desired, for example, blanching or cooking. Also, the degree of product heating will be related to the rate of product introduction and speed of travel through the heating module 1.

In order to maximize the throughput of the apparatus, the spacing of the steam emitting nozzles from one another should be minimized. Furthermore, the spacing of nozzles is a factor in providing adequate agitation or mixing of the product for uniform heating of a multilayer of product. It appears that a suitable range of nozzle spacing is from 2 to 4 inches.

For maximum efficiency, the nozzles should be placed as near as possible to the underside of the conveyor while avoiding mechanical interference.

The speed of the transfer valve 6 will be an integral fraction of that of the conveyor 2 to accumulate the desired amount of product in each compartment 16. The rotary motion of the transfer valve 6 may be made intermittent to facilitate product transfer.

To facilitate access to various components of the apparatus, the enclosures 4 and 23 preferably are provided with hinged or removable panels. The enclosures will preferably be well insulated to reduce heat loss.

In operation, with reference to FIGS. 1 and 2, the food products to be processed are introduced into the heating module 1, by means of the feed valve 5. The rotating feed valve 5 deposits the products onto the pervious conveyor 2 in a multilayer, within the enclosure 4, to be transported through the inner enclosure 8, where heat is supplied. Steam supplied to the nozzles 3, by a suitable pressurized source at 14, is directed upwardly through the pervious conveyor 2. The jets of steam emitted from the nozzles 3 provide regions of relatively high energy steam flow, separated by relatively quiescent regions. By subjecting the traversing products to the alternating high energy jets and quiescent periods, efficient agitation with vertical mixing of products is achieved which in turn provides uniform heat treatment of all products in a relatively thick layer. This contrasts with previous systems wherein only a single layer of product was treated.

Steam that is not condensed after passing through the conveyor and products thereon, is collected by the hood portion 9, and returned by means of the fan 12 through the conduit 11 to the lower portion 10 to be passed again through the conveyor 2. It should be noted that steam passing through the products comes from two sources, namely, the primary steam emitted directly from the nozzles 3, and the recirculated steam driven by the fan 12. The use of the inner enclosure and recirculation provides more efficient transfer of heat energy to the products with less heat loss to the outer enclosure 4. Condensed steam collects below the conveyor and is removed at outlet 19, via a steam trap.

After traversing the heating module 1, the heated products are transferred to the holding module 20 by means of the transfer valve 6. Each compartment 16 of the rotary transfer valve deposits a predetermined quantity consecutively into the receptacles 23 of the holding conveyor 21.

The drive means for the conveyor is arranged such that the speed of travel of the pervious conveyor 2 is greater than that of the holding conveyor 21. This provides that the products in the holding receptacles are concentrated in relatively thick layer or bulk to retard heat loss and allow transfer of heat from the surface to the core of the individual product without further heat input. After completing travel in the holding conveyor 21, the products can be further processed in a conventional manner, such as freezing or canning, transported by a suitable conveyor 30.

Figure 4:
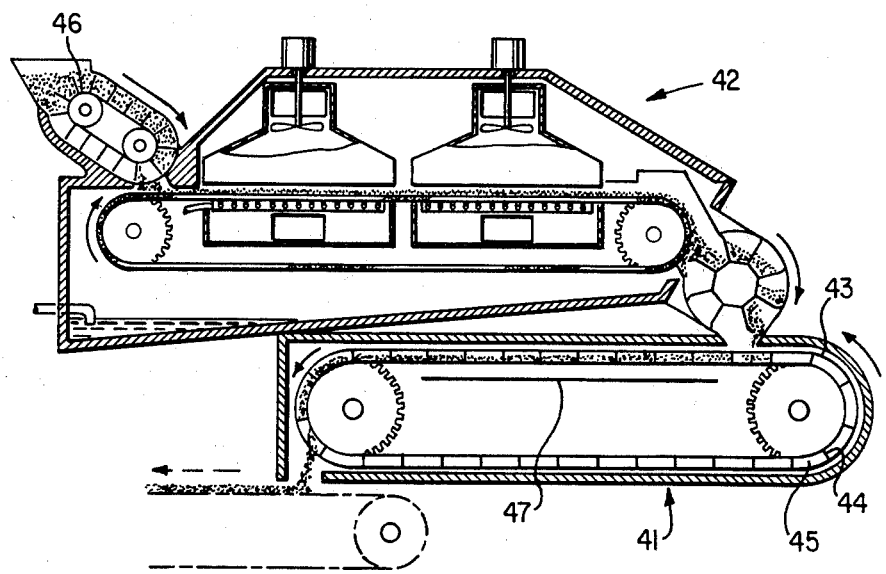
FIG. 4 is a schematic elevation view showing an alternate embodiment of the present invention.

FIG. 4 shows an alternate embodiment of the invention. The holding module 41 is shown disposed under the heating module 42. This configuration takes up less floor space. The receptacle means for the holding conveyor 43 is provided by a plurality of transverse dividers 44 disposed between side wall portions 45 on the conveyor. FIG. 4 also shows an alternate feed valve 46. A reflective panel 47 may be used to reduce heat loss to the space below the conveyor.

The apparatus may be provided with spray nozzles for product evacuation and cleaning and/or for the addition of desired additives.

A food processing apparatus that was constructed had an arrangement of nozzles similar to that illustrated in FIG. 3. The nozzles 3 provided fan shaped jets oriented at 30° to an adjacent jet on the same transverse manifold 13. The nozzles were spaced approximately 2¼ inches apart along the manifold 13 and the transverse manifolds 13 were spaced approximately 3¼ inches apart along the longitudinal manifold 14. The nozzles were spaced approximately ½-inch below the pervious belt 2 which comprised double mesh stainless steel and being approximately 85% open. Pressures were varied from 15 psi to 70 psi. While 45 psi was found to be suitable for most products, leafy products were best treated with lower pressures, and dense products at higher pressures.

We claim:

1. An apparatus for processing food products with steam comprising a heating module and a holding module;

said heating module comprising a pervious conveyor, a plurality of upwardly directed steam emitting nozzles positioned below the conveyor for agitating and heating food products on the conveyor, an outer enclosure enclosing the conveyor and nozzles, a feed valve defining the inlet to the enclosure and for depositing a multilayer of food products on the conveyor, and a transfer valve for transferring heated food products from the heating module to the holding module;

said holding module comprising a holding conveyor having receptacle means for receiving heated food products from the heating module, and holding the heated food products for a period of time at an elevated temperature.

2. The apparatus of claim 1 wherein said heating module further comprises an inner enclosure including a hood portion positioned above the conveyor for collecting uncondensed steam and a lower portion enclosing a region below the conveyor including the steam nozzles, conduit means interconnecting the hood portion and lower portion, and circulation means associated with the conduit for returning collected uncondensed steam for recirculation through the conveyor and food products thereon.

3. The apparatus of claim 1 wherein the transfer valve has a plurality of circumferentially arranged compartments each operatively adapted to deposit the contents thereof into one of said holding receptacles.

4. The apparatus of claim 1 wherein the feed valve comprises a rotary valve having a plurality of flexible sealing vanes.

5. The apparatus of claim 1 comprising a plurality of inner enclosure units arranged serially along the conveyor, each unit having a group of steam nozzles associated therewith.

6. The apparatus of claim 1 wherein the receptacle means comprises a plurality of receptacles arranged longitudinally along the holding conveyor.

7. The apparatus of claim 1 wherein the nozzles emit fan-shaped jets of steam.

8. The apparatus of claim 7 wherein the jets of some of the nozzles are oriented at different angles from other nozzles.

9. The apparatus of claim 1 wherein the nozzles are spaced laterally from 2 to 4 inches from one another.

10. The apparatus of claim 1 including means for driving the holding conveyor at speeds less than that of the pervious conveyor.

* * * * *